United States Patent
Wang

(10) Patent No.: US 10,812,182 B2
(45) Date of Patent: Oct. 20, 2020

(54) OPTICAL SIGNAL MEASUREMENT METHOD AND NETWORK DEVICE

(71) Applicant: HUAWEI TECHNOLOGIES CO., LTD., Shenzhen (CN)

(72) Inventor: Dawei Wang, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/939,269

(22) Filed: Mar. 28, 2018

(65) Prior Publication Data
US 2018/0219622 A1 Aug. 2, 2018

Related U.S. Application Data

(63) Continuation of application No. PCT/CN2016/099497, filed on Sep. 20, 2016.

(30) Foreign Application Priority Data

Sep. 28, 2015 (CN) .......................... 2015 1 0628417

(51) Int. Cl.
H04B 10/07 (2013.01)
H04B 10/079 (2013.01)
(Continued)

(52) U.S. Cl.
CPC . *H04B 10/07953* (2013.01); *H04B 10/07955* (2013.01); *H04B 10/07* (2013.01); *H04J 14/00* (2013.01); *H04Q 11/00* (2013.01)

(58) Field of Classification Search
CPC ........ H04B 10/07953; H04B 10/07955; H04B 10/07; H04J 14/00; H04Q 11/00
(Continued)

(56) References Cited

U.S. PATENT DOCUMENTS 6,654,561 B1* 11/2003 Terahara .......... H04B 10/07953
398/25
6,898,001 B2* 5/2005 Ishihara ............. H04B 10/0731
359/337

(Continued)

FOREIGN PATENT DOCUMENTS

CN 102763350 A 10/2012
CN 102301621 A 3/2014
(Continued)

OTHER PUBLICATIONS

T-Rec-G.697-201202-SIIPDF-E ITU-T, "Optical monitoring for dense wavelengthdivision multiplexing systems", Series G: Transmission Systems and Media, Digital Systems and Networks, Transmission media and optical systems characteristics—Characteristics of optical systems, dated Feb. 2012, total 40 pages.
(Continued)

*Primary Examiner* — Dibson J Sanchez
(74) *Attorney, Agent, or Firm* — Kilpatrick Townsend & Stockton LLP

(57) ABSTRACT

An optical signal measurement method includes: measuring a power $p_i$ of a first optical signal on a target frequency band at a moment Ti, and measuring a power $q_i$ of a second optical signal on the target frequency band at a moment Ti+Δt, where the first optical signal is a signal detected in an optical signal transmission source, the second optical signal is a signal detected on a to-be-measured node, and Δt is a transmission duration of transmitting an optical signal from the optical signal transmission source to the to-be-measured node. The method further includes determining an optical signal-to-noise ratio on the to-be-measured node based on a power array $P=[p_1, p_N]$ of the first optical signal on the target frequency band and a power array $Q=[q_1, q_N]$ of the second optical signal on the target frequency band.

16 Claims, 8 Drawing Sheets

(51) Int. Cl.
*H04J 14/00* (2006.01)
*H04Q 11/00* (2006.01)

(58) Field of Classification Search
USPC .................................. 398/9–38, 43–103
See application file for complete search history.

(56) References Cited

U.S. PATENT DOCUMENTS

| | | | | |
|---|---|---|---|---|
| 6,907,197 | B2* | 6/2005 | Heath | H04J 14/02 398/25 |
| 7,149,428 | B2* | 12/2006 | Chung | H04B 10/077 398/68 |
| 10,205,520 | B2* | 2/2019 | Chen | H04B 10/07953 |
| 2004/0146302 | A1* | 7/2004 | Balland | H04B 10/2935 398/94 |
| 2004/0161233 | A1 | 8/2004 | Zalevsky et al. | |
| 2004/0218919 | A1* | 11/2004 | Hunsche | H04B 10/07953 398/27 |
| 2005/0078957 | A1* | 4/2005 | Hendow | G01J 3/36 398/33 |
| 2005/0226628 | A1* | 10/2005 | Watanabe | H04B 10/25133 398/147 |
| 2006/0029391 | A1* | 2/2006 | Yuki | H04J 14/0221 398/45 |
| 2007/0297043 | A1* | 12/2007 | Kao | H04B 10/07953 359/337 |
| 2008/0080857 | A1* | 4/2008 | Goto | H04B 10/07953 398/26 |
| 2008/0124076 | A1* | 5/2008 | Rudolph | H04B 10/07953 398/26 |
| 2009/0214201 | A1* | 8/2009 | Oda | H04B 10/0795 398/25 |
| 2009/0317076 | A1* | 12/2009 | Shimizu | G01J 3/02 398/25 |
| 2010/0129074 | A1* | 5/2010 | Gariepy | H04B 10/07953 398/26 |
| 2012/0093501 | A1* | 4/2012 | He | H04B 10/07953 398/26 |
| 2012/0106951 | A1* | 5/2012 | Wan | H04B 10/0775 398/26 |
| 2012/0114330 | A1* | 5/2012 | Bruno | H04B 10/07953 398/26 |
| 2012/0155861 | A1 | 6/2012 | Liu | |
| 2012/0201533 | A1* | 8/2012 | Gariepy | H04B 10/07953 398/26 |
| 2013/0004175 | A1* | 1/2013 | Silveira | H04B 10/5051 398/79 |
| 2013/0209097 | A1* | 8/2013 | Vo | G02B 6/4215 398/38 |
| 2013/0330071 | A1* | 12/2013 | He | H04B 10/073 398/16 |
| 2014/0037287 | A1 | 2/2014 | Liu | |
| 2014/0086574 | A1* | 3/2014 | Gariepy | H04B 10/07 398/26 |
| 2014/0198311 | A1* | 7/2014 | L'Heureux | G01M 11/3118 356/73.1 |
| 2014/0270756 | A1* | 9/2014 | Oda | H04B 10/0791 398/26 |
| 2014/0328586 | A1* | 11/2014 | He | H04B 10/07953 398/26 |
| 2015/0043906 | A1 | 2/2015 | Zhou et al. | |
| 2015/0155935 | A1* | 6/2015 | Oda | H04B 10/07953 398/26 |
| 2016/0072579 | A1* | 3/2016 | Schroeder | H04B 10/07953 398/26 |
| 2016/0127074 | A1* | 5/2016 | He | H04J 14/06 398/26 |
| 2016/0142135 | A1 | 5/2016 | He et al. | |
| 2016/0164599 | A1* | 6/2016 | Heismann | H04B 10/07955 398/26 |
| 2016/0308611 | A1* | 10/2016 | Oda | H04J 14/06 |
| 2017/0019173 | A1* | 1/2017 | Li | H04B 10/61 |
| 2017/0033866 | A1* | 2/2017 | Wang | H04B 10/077 |
| 2017/0041075 | A1* | 2/2017 | Nakagawa | H04B 10/07953 |
| 2018/0337727 | A1* | 11/2018 | Yoshida | H04B 10/07953 |

FOREIGN PATENT DOCUMENTS

| | | |
|---|---|---|
| CN | 104883220 A | 9/2015 |
| CN | 105577272 A | 5/2016 |
| EP | 2393223 A1 | 12/2011 |
| WO | 2011022889 A1 | 3/2011 |

OTHER PUBLICATIONS

Magnus Borga: "Canonical Correlation—a Tutorial", Jan. 12, 2001, pp. 1-12, XP055251847.

Peter J. Schreier:"A Unifying Discussion of Correlation Analysis for Complex Randon Vectors", IEEE Transactions on Signal Processing, IEEE Service Center, vol. 56, No. 4, Apr. 1, 2008, pp. 1327-1336, XP011205901.

* cited by examiner

200

Obtain power $p_i$ of a first optical signal on a target frequency band at a moment Ti, and obtain power $q_i$ of a second optical signal on the target frequency band at a moment Ti+Δt, where the first optical signal is a signal detected in an optical signal transmission source, the second optical signal is a signal detected on a to-be-measured node, Δt is a transmission duration of transmitting an optical signal from the optical signal transmission source to the to-be-measured node, $1 \leq i \leq N$, and N is a positive integer greater than 1 — 210

Determine an optical signal-to-noise ratio on the to-be-measured node according to a power array $P=[p_1, p_N]$ of the first optical signal on the target frequency band and a power array $Q=[q_1, q_N]$ of the second optical signal on the target frequency band — 220

FIG. 2

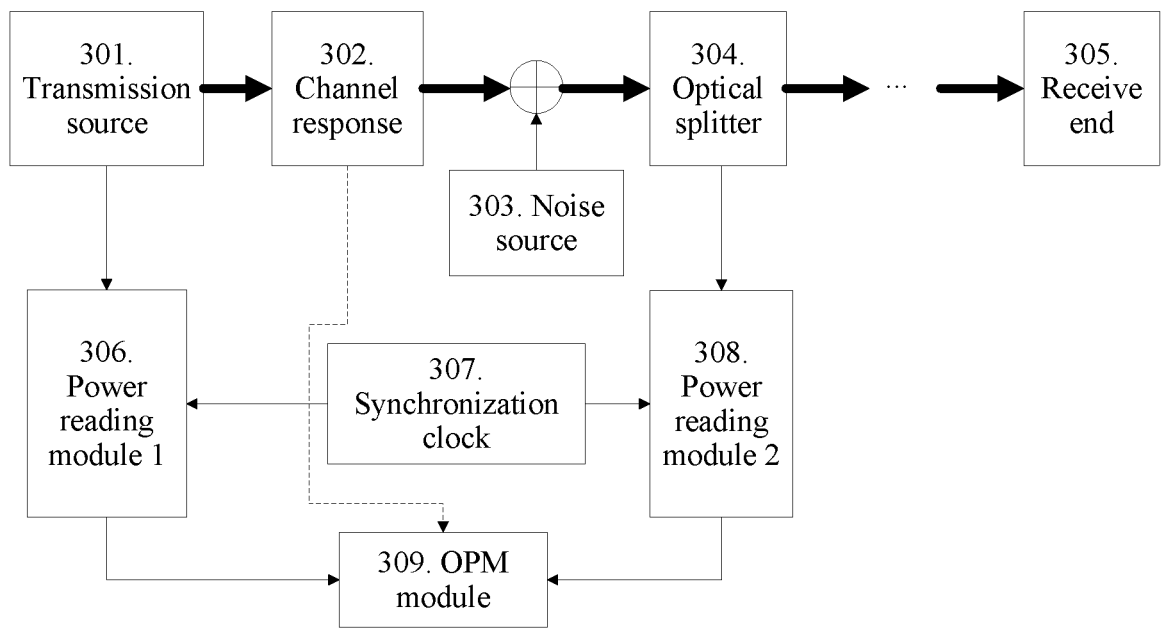

FIG. 3

OPTICAL SIGNAL MEASUREMENT METHOD AND NETWORK DEVICE

CROSS-REFERENCE TO RELATED APPLICATIONS

This application is a continuation of International Application No. PCT/CN2016/099497, filed on Sep. 20, 2016, which claims priority to Chinese Patent Application No. 201510628417.7, filed on Sep. 28, 2015. The disclosures of the aforementioned applications are hereby incorporated by reference in their entireties.

TECHNICAL FIELD

The present disclosure relates to the communications field, and more specifically, to an optical signal measurement method and a network device.

BACKGROUND

With development of the Internet, people have higher requirements on a bandwidth. The development of multimedia technologies and mobile interworking technologies further promotes such requirements on a communication bandwidth. Under various driving forces, a scale of large-capacity optical networks laid by communication operators is increasing. Key related technologies include: an erbium-doped fiber amplifier (EDFA), dense wavelength division multiplexing (DWDM), an advanced modulation format (AMF), and the like. In addition, with application of an optical switching device and a wavelength conversion device, the optical network develops to be flexible and reconfigurable, and have a transparent service. Because dynamic allocation is introduced to such a network, network management and monitoring become complex. For a communications network with a large capacity, a communication interruption of even a short time affects terabits of data. In this background, to ensure quality of service (QoS) of a user, optical performance monitoring (OPM), that is, optical signal quality monitoring at a physical layer, is a necessary solution for preventing and detecting an optical link fault.

There are multiple parameters used to represent the optical signal quality, for example, a Q value of a signal, a bit error rate (BER), power, an optical signal-to-noise ratio (OSNR), and residual dispersion. In the OPM, one or more of the parameters are monitored to complete monitoring of quality of an optical signal at the physical layer. OSNR monitoring is an important part of the OPM. A definition of the OSNR is a power ratio of an optical signal to noise on a 0.1 nm bandwidth, and the OSNR may be expressed in the following formula:

$$OSNR = \frac{P_{Signal}}{B * N_0},$$

where $P_{Signal}$ is power (excluding noise power) of the signal, B is an equivalent bandwidth (that is generally 0.1 nm or equivalent to 12.5 GHz) of the noise, and $N_0$ is power spectrum density of the noise, that is, noise power per unit frequency bandwidth. It can be learned that the OSNR represents a power ratio of a wanted optical signal to an interference optical signal. A greater OSNR indicates less interference, that is, better quality of the optical signal. Therefore, it is generally considered that a magnitude of the OSNR directly reflects signal quality.

Measurement precision of an OSNR measurement method in the prior art is not sufficient, and the measurement precision is generally limited by a feature of an optical signal.

SUMMARY

Embodiments of the present invention provide an optical signal measurement method and a network device, so as to precisely measure an OSNR.

According to some embodiments, an optical signal measurement method includes: measuring a power $p_i$ of a first optical signal on a target frequency band at a moment Ti, and measuring a power $q_i$ of a second optical signal on the target frequency band at a moment Ti+Δt, where the first optical signal is a signal detected in an optical signal transmission source, the second optical signal is a signal detected on a to-be-measured node, Δt is a transmission duration of transmitting an optical signal from the optical signal transmission source to the to-be-measured node, 1≤i≤N, and N is a positive integer greater than 1. The method further includes determining an optical signal-to-noise ratio on the to-be-measured node based on a power array $P=[p_1, p_N]$ of the first optical signal on the target frequency band and a power array $Q=[q_1, q_N]$ of the second optical signal on the target frequency band.

According to some other embodiments, a network device includes a receiver configured to measure a power $p_i$ of a first optical signal on a target frequency band at a moment Ti, and measure a power $q_i$ of a second optical signal on the target frequency band at a moment Ti+Δt, where the first optical signal is a signal detected in an optical signal transmission source, the second optical signal is a signal detected on a to-be-measured node, Δt is a transmission duration of transmitting an optical signal from the optical signal transmission source to the to-be-measured node, 1≤i≤N, and N is a positive integer greater than 1. The network device further includes a processor configured to determine an optical signal-to-noise ratio on the to-be-measured node based on a power array $P=[p_1, p_N]$ of the first optical signal on the target frequency band and a power array $Q=[q_1, q_N]$ of the second optical signal on the target frequency band.

According to some further embodiments, an optical signal measurement system includes a first power measurement apparatus, a second power measurement apparatus, a synchronization clock, and an optical performance monitoring OPM apparatus. The first power measurement apparatus is configured to measure a power of a first optical signal on a target frequency band, where the first optical signal is a signal detected in an optical signal transmission source. The second power obtaining apparatus is configured to measure a power of a second optical signal on the target frequency band, where the second optical signal is a signal detected on a to-be-measured node. The synchronization clock is configured to: control the first power measurement apparatus to measure a power $p_i$ of the first optical signal on the target frequency band at a moment Ti, and control the second power measurement apparatus to measure a power $q_i$ of the second optical signal on the target frequency band at a moment Ti+Δt, where 1≤i≤N, and N is a positive integer greater than 1. The OPM apparatus is configured to determine an optical signal-to-noise ratio on the to-be-measured node based on a power array $P=[p_1, p_N]$ of the first optical signal on the target frequency band and a power array Q=[$q_1$, $q_N$] of the second optical signal on the target frequency band.

BRIEF DESCRIPTION OF DRAWINGS

To describe the technical solutions in the embodiments of the present invention more clearly, the following briefly describes the accompanying drawings.

FIG. 2 is a schematic flowchart of an optical signal measurement method according to an embodiment of the present invention;

FIG. 3 is a schematic block diagram of an optical noise measurement device according to an embodiment of the present invention;

DESCRIPTION OF EMBODIMENTS

The following describes the technical solutions in the embodiments of the present invention with reference to the accompanying drawings. Apparently, the described embodiments are a part rather than all of the embodiments.

Figure 1:
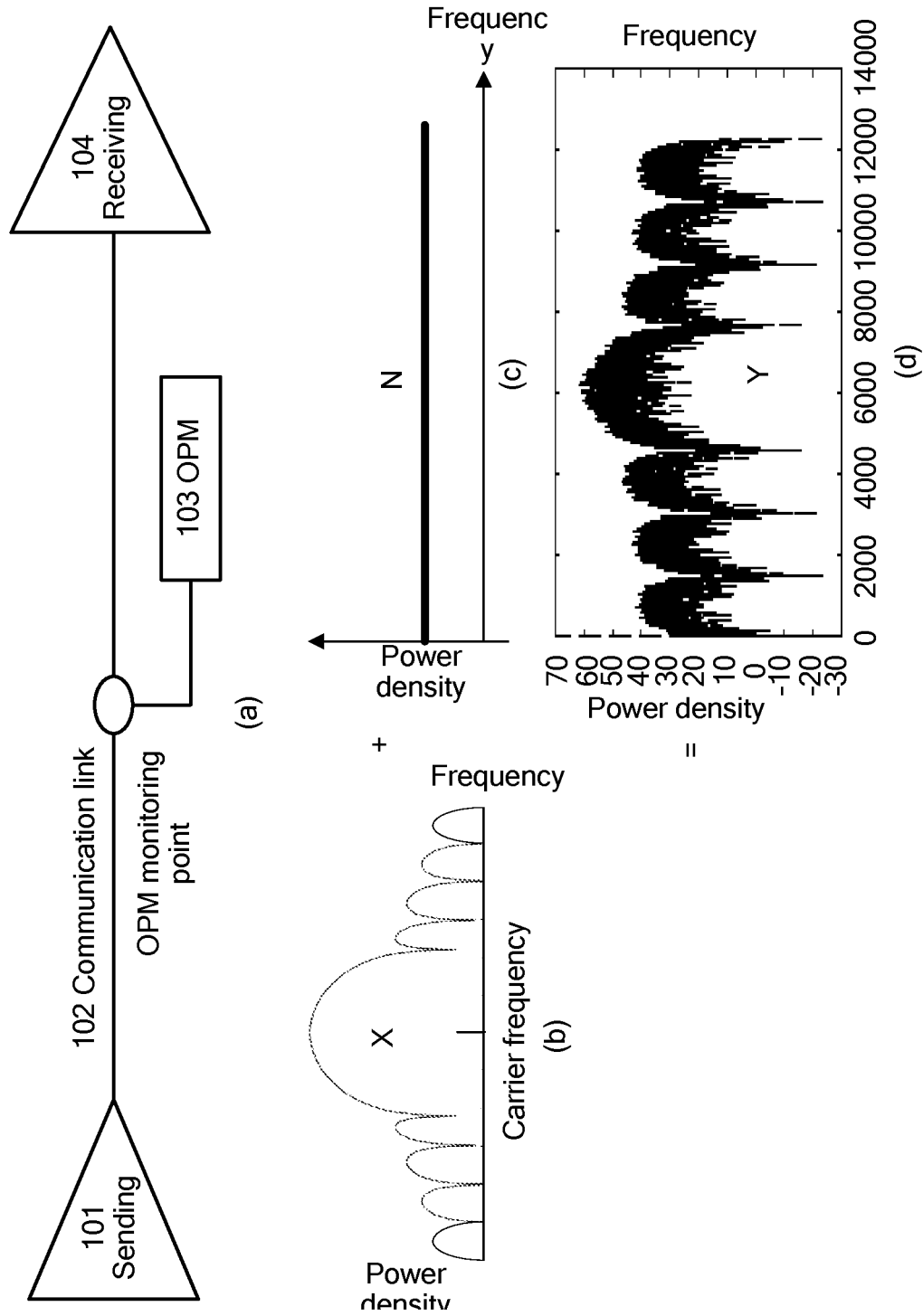
FIG. 1 is a schematic diagram of optical performance monitoring in a communication link according to an embodiment of the present invention.

FIG. 1 is a schematic diagram of optical performance monitoring in a communication link according to some embodiments.

An optical signal carried in an optical network generally uses a digital modulation scheme, that is, digital signals, 0, 1, 0, and 1 (low levels and high levels), are modulated onto a lightwave with a frequency of approximately 190 THz. Therefore, a digital modulation signal that changes with time may be transformed to a frequency domain by means of Fourier transform, so as to obtain frequency composition information of the signal. A power spectrum of a frequency domain signal may be obtained by squaring an absolute value of the signal. A typical power spectrum of a digital modulation signal is shown in FIG. 1(b). The power spectrum indicates a magnitude of power of the signal at a frequency. Typically, a signal has maximum power at a carrier frequency.

As shown in FIG. 1(a), an optical signal sent by an optical signal transmission source 101 is received by a receive end 104 after being transmitted by using a communication link 102. In the communication link, an optical splitter is disposed by using an OPM monitoring point 103 in the communication link, and a part of light in the link is separated to be a to-be-measured signal, so as to perform OPM at the OPM monitoring point.

As shown in FIG. 1(b), when a signal initially leaves a transmit end, a power spectrum X is relatively clean. After the signal is transmitted by using a communication link, noise N is superimposed onto the originally "clean" signal power spectrum, and as shown in FIG. 1(c). A noise spectrum is generally flat. It is assumed that the original signal power spectrum is represented by X, the noise spectrum is represented by N, and a superimposed power spectrum is Y=X+N, as shown in FIG. 1(d).

An OSNR reflects a ratio of X to N. However, N is difficult to directly measure, but X and Y are easy to measure. Therefore, embodiments of the present invention provide a method for determining an OSNR of a to-be-measured signal by using canonical correlation analysis (CCA). In the CCA, power of a transmission source and power of a to-be-measured signal are measured simultaneously. A mutual correlation operation is performed on the power of the transmission source and the power of the to-be-measured signal, so that an OSNR parameter unrelated to absolute power values of the transmission source and the to-be-measured signal may be determined. In the CCA, it is assumed that a power difference between the transmission source and the to-be-measured signal is caused by additive noise only. However, an actual channel response of a communication link generally affects a power spectrum shape of the transmission source. Therefore, in some embodiments, power values that are synchronously measured and a channel response parameter is transmitted to an OPM module for OSNR determination.

FIG. 2 is a schematic flowchart of an optical signal measurement method according to an embodiment of the present invention. As shown in FIG. 2, the method 200 includes:

210. Measure a power $p_i$ of a first optical signal on a target frequency band at a moment $T_i$, and measure a power $q_i$ of a second optical signal on the target frequency band at a moment $T_i+\Delta t$, where the first optical signal is a signal detected in an optical signal transmission source, the second optical signal is a signal detected on a to-be-measured node, $\Delta t$ is a transmission duration of transmitting an optical signal from the optical signal transmission source to the to-be-measured node, $1 \leq i \leq N$, and N is a positive integer greater than 1.

220. Determine an optical signal-to-noise ratio on the to-be-measured node based on a power array P=[$p_1$, $p_N$] of the first optical signal on the target frequency band and a power array Q=[$q_1$, $q_N$] of the second optical signal on the target frequency band.

It should be understood that an optical signal carried in an optical network generally uses a digital modulation scheme. A digital modulation time-domain signal that changes with time is transferred into a frequency-domain signal by means of Fourier Transform, so as to obtain frequency spectrum information of the signal, and a power spectrum of the signal may be obtained by squaring an absolute value of the frequency-domain signal.

In step 210, the first optical signal is a signal in the optical signal transmission source and is not heavily polluted by noise. When the first optical signal is initially generated from a transmit end, a power spectrum is quite clean because the first optical signal is not polluted by noise. The second optical signal is an optical signal that is separated on the to-be-measured node by using an optical splitter, and the originally clean first optical signal becomes the second optical signal after being transmitted by using a communication link. A noise signal is superimposed onto a power spectrum of the second optical signal.

In an actual application, a synchronization module may be used to perform clock distribution. That is, the synchronization module controls a power reading operation on the first optical signal at the moment Ti, and a power reading operation on the second optical signal at the moment Ti+Δt. Δt represents a transmission duration of transmitting an optical signal from the transmission source to the to-be-measured node. That is, the power reading operation is performed on the first optical signal at the moment Ti, and the power reading operation is performed on the second optical signal at the moment Ti+Δt. This means that the first optical signal and the second optical signal that are separated from an optical signal in the transmission source are read after passing through the synchronization module.

In some embodiments, the power of the first optical signal on the target frequency band and the power of the second optical signal on the target frequency band are synchronously measured. The power of the first optical signal or the second optical signal on the target frequency band may be measured by using an optical filter or a spectrograph. It should be understood that another apparatus that can obtain optical power may also be used to read the power of the first optical signal and the second optical signal.

In some embodiments, when a filter and a power meter are used to measure the power of the first optical signal and the second optical signal on the target frequency band, a target bandwidth may be less than a total bandwidth of the first optical signal or the second optical signal. A purpose of this configuration of the filter is to reduce as much as possible the impact of an optical power spectrum shape change caused by channel filtering on a power measurement result.

It should be understood that the target bandwidth may also be located in another location of a spectrum It should be further understood that the target bandwidth may also be equivalent to a total spectrum bandwidth of the first optical signal or the second optical signal. When a magnitude of the target bandwidth approaches that of the total spectrum bandwidth of the optical signal, a more precise channel filtering response may be desirable. Therefore, the target bandwidth and compensation precision of a channel response are mutually constrained.

In step 220, because the OSNR reflects a ratio of an optical signal to optical noise, and it is difficult to directly measure the optical noise, the first optical signal that is not polluted by the noise and the second optical signal that is polluted by the noise may be measured. Δt represents the transmission duration of transmitting an optical signal from the transmission source to the to-be-measured node. Therefore, the second optical signal obtained after the time interval Δt is the first optical signal on which the noise is added, and there is a signal correlation between the first optical signal and the second optical signal. The optical signal-to-noise ratio on the to-be-measured node may be determined by using the power array $P=[p_1, p_N]$ of the first optical signal on the target frequency band and the power array $Q=[q_1, q_N]$ of the second optical signal on the target frequency band that are measured in step 210.

It should be understood that a more precise optical signal-to-noise ratio on the to-be-measured node may be determined by averaging the powers of the first optical signal and the powers of the second optical signal on the target frequency band that are repeatedly measured multiple times.

According to some embodiments, an optical power of the optical signal that is in the transmission source and is not polluted by noise and an optical power of the optical signal that is on the to-be-measured node and is polluted by noise are measured by means of time synchronization, and the optical signal-to-noise ratio on the to-be-measured node is determined according to signal correlation between the optical signal polluted by noise and the optical signal not polluted by noise. The OSNR can be precisely measured by using this method without being limited by a feature of an optical signal.

In some other embodiments, the determining an optical signal-to-noise ratio on the to-be-measured node based on a power array $P=[p_1, p_N]$ of the first optical signal on the target frequency band and a power array $Q=[q_1, q_N]$ of the second optical signal on the target frequency band includes: determining a canonical correlation analysis CCA parameter for the first optical signal and the second optical signal on the target frequency band based on the power array $P=[p_1, p_N]$ of the first optical signal on the target frequency band and the power array $Q=[q_1, q_N]$ of the second optical signal on the target frequency band, and determining the optical signal-to-noise ratio on the to-be-measured node using the CCA parameter.

In some embodiments, an OSNR of a to-be-measured optical signal on the to-be-measured node may be determined by using a canonical correlation analysis (CCA) method. In the CCA, a power of a transmission source and a power of a to-be-measured signal are measured simultaneously. A mutual correlation operation is performed on the power of the transmission source and the power of the to-be-measured signal, so that an OSNR unrelated to absolute power values of the transmission source and the to-be-measured signal may be determined.

In some other embodiments, the obtaining the canonical correlation analysis CCA parameter for the first optical signal and the second optical signal on the target frequency band based on the power array $P=[p_1, p_N]$ of the first optical signal on the target frequency band and the power array $Q=[q_1, q_N]$ of the second optical signal on the target frequency band includes: performing a correlation operation on the power array $P=[p_1, p_N]$ and the power array $Q=[q_1, q_N]$, which includes: calculating the canonical correlation analysis CCA parameter for the first optical signal and the second optical signal on the target frequency band by using the following formula (1):

$$\rho = \frac{E(PQ)}{\sqrt{E(P^2)E(Q^2)}}, \quad (1)$$

where
$E(PQ)=\Sigma_{i=1}^{i=N}(p_i \times q_i)$, $E(P^2)=\Sigma_{i=1}^{i=N}(p_i \times p_i)$, and $E(Q^2)=\Sigma_{i=1}^{i=N}(q_i \times q_i)$; and calculating the optical signal-to-noise ratio parameter on the to-be-measured node according to the CCA parameter by using the following formula (2):

$$O = \frac{\rho^2}{1-\rho^2}. \quad (2)$$

In some embodiments, the optical signal-to-noise ratio parameter may also be calculated according to the following formulas (3) and (4):

$$O = \frac{c \cdot E(PQ)}{E(Q^2)}, \quad (3)$$

where c is a power correction coefficient; and $$O = \frac{(b^2 - a^2) \cdot E(PQ)}{a \cdot b[E(P^2) - E(Q^2)]}, \quad (4)$$

where a and b are respectively power correction coefficients of P and Q.

It should be understood that a specific formula for calculating the OSNR is not limited to the foregoing formulas.

In some other embodiments, the obtaining a canonical correlation analysis CCA parameter for the first optical signal and the second optical signal on the target frequency band based on the power array $P=[p_1, p_N]$ of the first optical signal on the target frequency band and the power array $Q=[q_1, q_N]$ of the second optical signal on the target frequency band includes: correcting the power array $P=[p_1, p_N]$ of the first optical signal on the target frequency band using a channel response parameter to obtain a corrected power array $P'=P \times H$ of the first optical signal, correcting the power array $Q=[q_1, q_N]$ of the second optical signal on the target frequency band using the channel response parameter to obtain a corrected power array $Q'=Q \times H$ of the second optical signal, and calculating the CCA parameter for the first optical signal and the second optical signal on the target frequency band based on the corrected power array P' of the first optical signal and the corrected power array Q' of the second optical signal.

In some embodiments, in the CCA, it is assumed that a power difference between an optical signal in the transmission source and an optical signal on the to-be-measured node is caused by added noise only. However, an actual channel response of a communication link may affect a power spectrum shape of the transmission source. Therefore, in some embodiments, impact of a channel response parameter on the first optical signal are considered. Generally, a channel response (especially a channel filtering response) does not change with time. Therefore, a channel response parameter H may be calibrated in advance and stored in an OPM module, and the channel response parameter H is fed back to the OPM module in real time according to a dynamic model of a channel.

In some other embodiments, the target frequency band includes M frequency bands with an interval between adjacent frequency bands. The measuring a power $p_i$ of a first optical signal on a target frequency band at a moment Ti, and measuring power $q_i$ of a second optical signal on the target frequency band at a moment Ti+Δt include measuring a power $p_{ij}$ of the first optical signal on the $j^{th}$ frequency band, and measuring a power $q_{ij}$ of the second optical signal on the $j^{th}$ frequency band, where $1 \le j \le M$, and M is a positive integer greater than 1. The determining the optical signal-to-noise ratio on the to-be-measured node based on a power array $P=[p_1, p_N]$ of the first optical signal on the target frequency band and a power array $Q=[q_1, q_N]$ of the second optical signal on the target frequency band includes determining an optical signal-to-noise ratio parameter $O_j$ on the $j^{th}$ frequency band based on a power array $p_i=[p_{i1}, p_{iM}]$ of the first optical signal on the $j^{th}$ frequency band and a power array $q_i=[q_{i1}, q_{iM}]$ of the second optical signal on the $j^{th}$ frequency band, and determining an average of M optical signal-to-noise ratios $O_j$ as the optical signal-to-noise ratio on the to-be-measured node.

In some embodiments, multiple filters and multiple power meters may be used to obtain power of multiple different frequency bands. In some other embodiments, one spectrum collection module may be used to obtain a power spectrum of a signal, so as to obtain power on M different frequency bands in the power spectrum. In some embodiments, there are specific intervals between central frequencies of the multiple different frequency bands, and the intervals between the central frequencies of the bands may be the same or different. A bandwidth of each frequency band is less than a total power spectrum bandwidth of an optical signal.

At the moment Ti, a power of the first optical signal on each frequency band of the M different frequency bands is measured, and a power of the second optical signal on each frequency band of the M different frequency bands is measured at the moment Ti+Δt, so as to determine M signal-to-noise ratios. For example, powers of the first optical signal on a frequency band 1, a frequency band 2, a frequency band 3, . . . , and a frequency band N may be measured at the moment Ti as $P_{i1}$, $P_{i2}$, $P_{i3}$, . . . , $P_{iN}$ respectively, and powers of the second optical signal on the frequency band 1, the frequency band 2, the frequency band 3, . . . , and the frequency band N may be measured at the moment Ti+Δt as $Q_{i1}$, $Q_{i2}$, $Q_{i3}$, . . . , and $Q_{iN}$ respectively, so that canonical correlation analysis may be performed on $P_{ij}$ and $Q_{ij}$ to obtain M CCA parameters. For example, an optical signal-to-noise ratio parameter for the powers of the first optical signal and the second optical signal on the $j^{th}$ frequency band is calculated as $O_j$, and M optical signal-to-noise ratios O are calculated using the M CCA parameters. An average of the M optical signal-to-noise ratios is used as an optical signal-to-noise ratio on the to-be-measured node as $$O = \frac{1}{N} \sum_{1}^{N} O_1.$$

In some other embodiments, a center frequency of the target frequency band is substantially equal to a center frequency of the first optical signal, and a bandwidth of the target frequency band is less than a total frequency bandwidth of the first optical signal; and the center frequency of the target frequency band is substantially equal to a center frequency of the second optical signal, and the bandwidth of the target frequency band is less than a total frequency bandwidth of the second optical signal.

In some embodiments, a center frequency of a filter may be set to be the same as the center frequency of the first optical signal or the second optical signal, so as to implement that the center frequency of the target frequency band is the same as the spectrum center frequency of the first optical signal or the second optical signal. A purpose of this configuration of the filter is to reduce as much as possible any impact of an optical power spectrum shape change caused by channel filtering on a power measurement result.

In some other embodiments, the powers of the first optical signal and the second optical signal on the target frequency band may be measured multiple times. An OSNR parameter determined in the foregoing manner and an actual OSNR parameter may have a linear relationship. The linear relationship may be calibrated in advance and stored on the to-be-measured node, and the determined OSNR parameter is corrected to obtain a more precise OSNR value.

Therefore, according to some embodiments, an optical power of the optical signal that is in the transmission source and is not polluted by noise and an optical power of the optical signal that is on the to-be-measured node and is polluted by noise are measured by means of time synchronization, and the optical signal-to-noise ratio on the to-be-measured node is determined according to signal correlation between the optical signal polluted by noise and the optical signal not polluted by noise. The OSNR can be precisely measured by using this method without being limited by a feature of an optical signal.

FIG. 3 is a schematic block diagram of an optical noise measurement device according to an embodiment of the present invention.

As shown in FIG. 3, an optical signal is sent from a transmission source (301) to a receiving end (305). A first optical signal that is not heavily polluted by noise is measured by a power reading module 1 (306) in the transmission source. The power reading module 1 (306) measures a power of the first optical signal on a target frequency band. After being affected by a channel response (302) and a noise response (303) in a link, a second optical signal is split by a splitter (304) on the to-be-measured node. The second optical signal obtained after splitting by the splitter (304) is read by a power reading module 2 (308), and the power reading module 2 (308) measures a power of the second optical signal on the target frequency band. In an actual application, a synchronization clock (307) may be used to perform synchronization clock distribution, that is, the synchronization clock (307) instructs the power reading module 1 and the power reading module 2 to perform a power reading operation at a time interval Δt. Δt represents a transmission duration of transmitting an optical signal from the transmission source to the to-be-measured node. The power values are returned to the OPM module (309) to continue determination of an OSNR. Impact of the channel response (302) on an optical signal is stored in the OPM module (309), so as to perform channel response correction on the first optical signal during the determination of the OSNR. In general, the channel response (especially a channel filtering response) does not change with time. Therefore, a channel response coefficient may be calibrated in advance and stored in an OPM module, and the channel response coefficient is fed back to the OPM module in real time according to a dynamic model of a channel.

In some embodiments, a power value of the transmission source is recorded by the OPM module multiple times to obtain a power array P. The array P is corrected by using a channel response parameter. A power value of a to-be-measured signal is recorded multiple times to obtain a power array Q. Canonical correlation analysis is performed on P and Q to obtain a CCA parameter, and the CCA parameter is used to determine an OSNR parameter.

Therefore, according to some embodiments, the optical power of the optical signal that is in the transmission source and not polluted by noise and the optical power of the optical signal that is on the to-be-measured node and is polluted by noise are measured by means of time synchronization, and the optical signal-to-noise ratio on the to-be-measured node is determined according to signal correlation between the optical signal polluted by noise and the optical signal not polluted by noise. The OSNR can be precisely measured by using this method without being limited by a feature of an optical signal.

Figure 4:
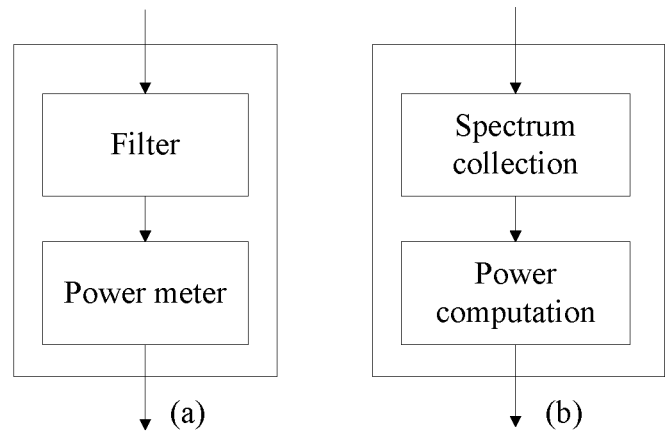
FIG. 4 is a schematic block diagram of a power reading module according to an embodiment of the present invention.

FIG. 4 is a schematic block diagram of a power reading module according to an embodiment of the present invention.

As shown in FIG. 4(a), the power reading module may be a combination of a filter and a power meter, and the filter may be a thin film filter, a liquid crystal filter, or the like.

As shown in FIG. 4(b), the power reading module may also be a combination of a spectrum collection device and a power calculation device, for example, various types of spectrographs.

Therefore, because a filter and a power calculation method are used, hardware costs may be quite low.

Figure 5:
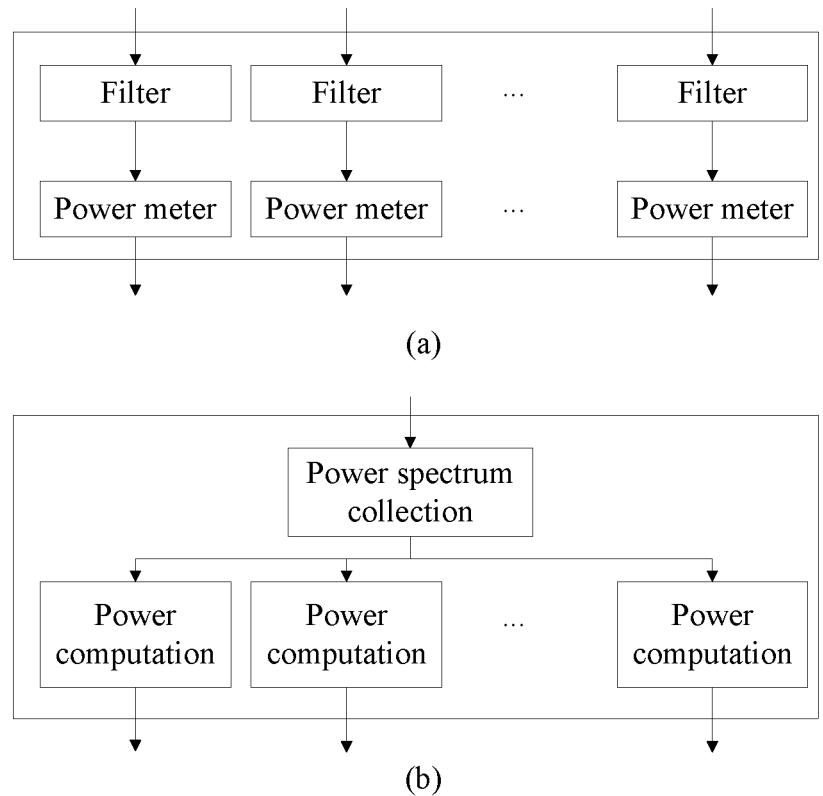
FIG. 5 is a schematic block diagram of a power reading module according to another embodiment of the present invention.

FIG. 5 is a schematic block diagram of a power reading module according to another embodiment of the present invention.

As shown in FIG. 5(a), the power reading module may be a combination of a filter and a power meter. Multiple combinations of a filter and a power meter may be used to measure optical power on multiple frequency bands in an optical signal frequency spectrum, so as to obtain optical signal-to-noise ratios on the multiple frequency bands. The multiple optical signal-to-noise ratios are averaged to obtain a more precise optical signal-to-noise ratio.

As shown in FIG. 5(b), the power reading module may also be a combination of a spectrum collection device and multiple power calculation devices, for example, various types of spectrographs.

Therefore, because a filter and a power calculation method are used, on the basis of relatively low hardware costs, the precision of an optical signal-to-noise ratio may be ensured.

Figure 6:
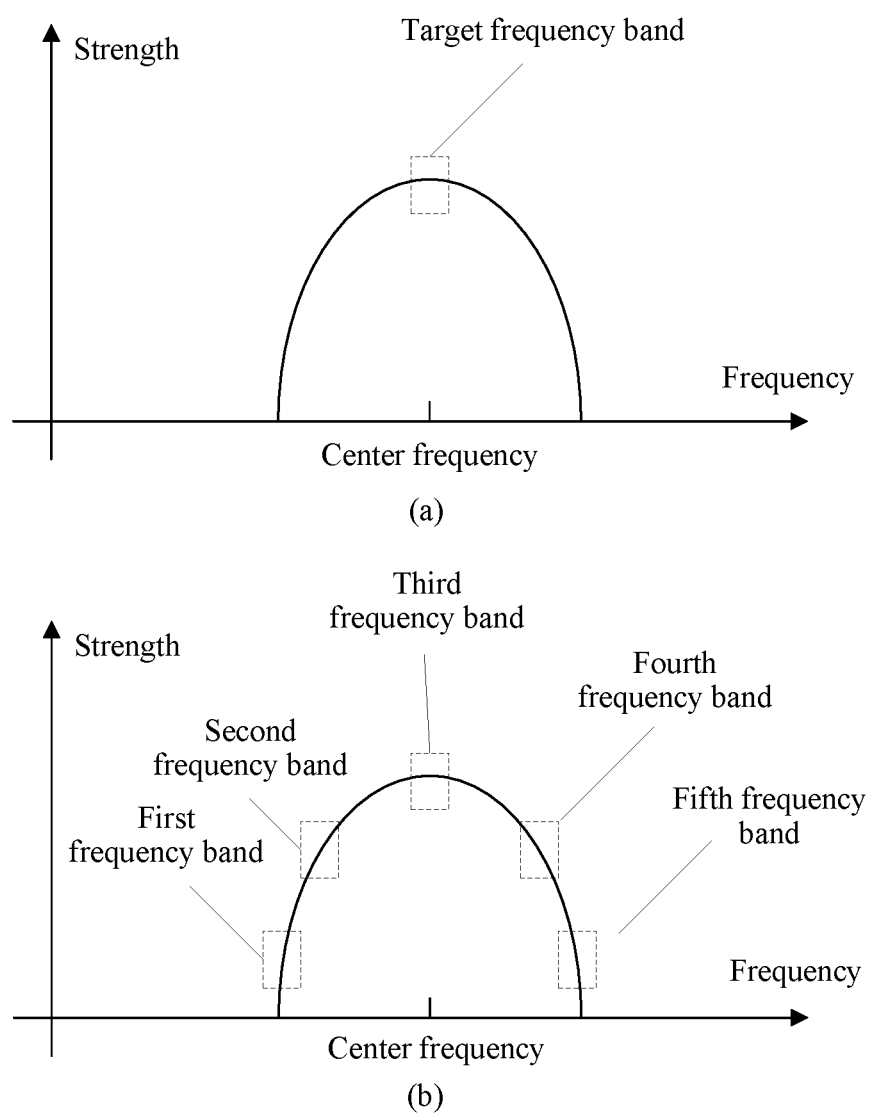
FIG. 6 is a schematic diagram of an optical signal power spectrum according to an embodiment of the present invention.

FIG. 6 is a schematic diagram of an optical signal power spectrum according to an embodiment of the present invention.

As shown in FIG. 6(a), a center frequency of a filter may be set to be the same as a center frequency of a first optical signal or a second optical signal, so as to implement that a center frequency of a target frequency band is the same as the spectrum center frequency of the first optical signal or the second optical signal. In addition, a target bandwidth obtained by the filter may be less than a total bandwidth of an optical signal. A purpose of this configuration of the filter is to reduce as much as possible any impact of an optical power spectrum shape change caused by channel filtering on the power measurement result. The schematic diagram of the power spectrum shown in FIG. 6(a) corresponds to readings of the power reading module in FIG. 5(a).

It should be understood that a filter or a power calculation range whose bandwidth approximates to a bandwidth of a to-be-measured signal may also be selected. However, if a bandwidth in power calculation is greater, impact of a channel filtering response on a result may be greater, and it may be desirable that the channel response compensation is extremely precise. Therefore, the bandwidth in the power calculation and compensation precision of a channel response are mutually constrained. In an actual application, if the channel response compensation cannot be extremely precise, it may be desirable that a selected bandwidth in power calculation is as small as possible.

As shown in FIG. 6(b), a first frequency band, a second frequency band, . . . , and a fifth frequency band may exist. In some embodiments, multiple filters and multiple power meters may be used to obtain power of multiple different frequency bands, or one spectrum collection module may be used to obtain a power spectrum of a signal, so as to obtain powers on M different frequency bands in the power spectrum. In some embodiments, specific intervals may exist between center frequencies of five different frequency bands, and a bandwidth of each frequency band is less than a total power spectrum bandwidth of an optical signal. The schematic diagram of the power spectrum shown in FIG. 6(b) correspond to readings of the power reading module in FIG. 5(b).

Figure 7:
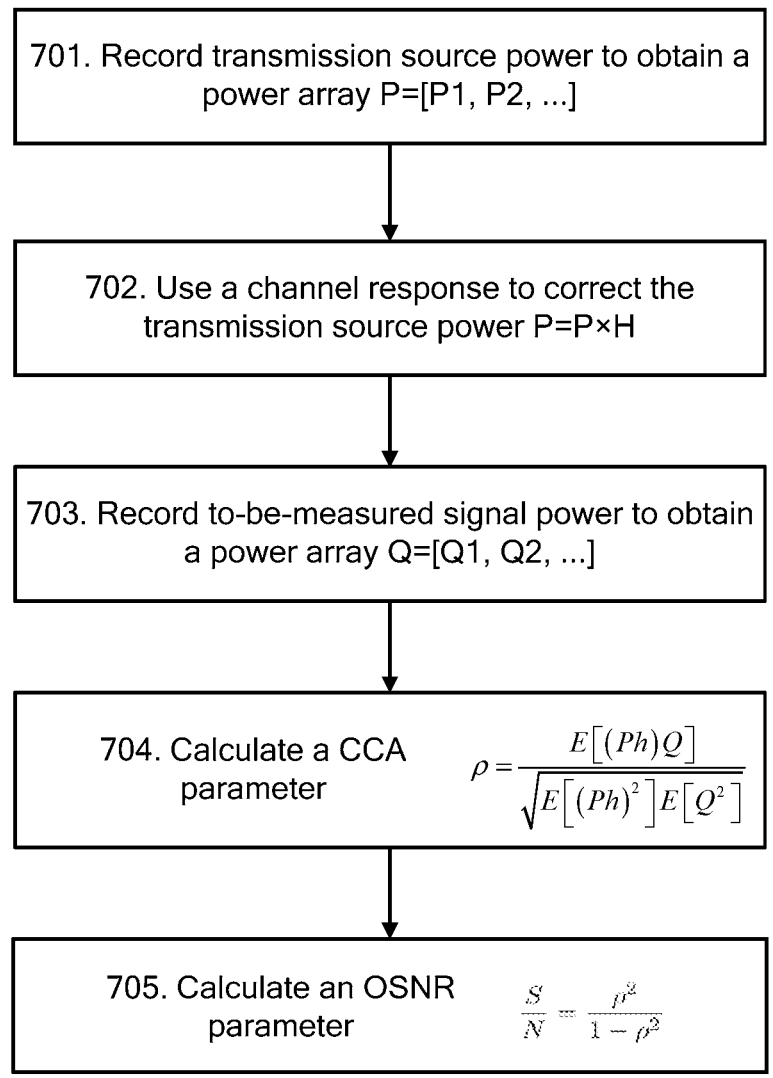
FIG. 7 is a schematic flowchart of calculating an OSNR according to an embodiment of the present invention.

FIG. 7 is a schematic flowchart of determining an OSNR according to an embodiment of the present invention. A process may include the following steps.

701. Record transmission source power to obtain a power array $P=[P_1, \ldots, P_N]$. Specifically, the power reading module in the FIG. 3 to FIG. 7 may perform measurement multiple times to measure a first optical signal (an optical signal that is in a signal source and that is not polluted by noise).

702. Use a channel response H to correct the transmission source power $P=P \times H$.

703. Record signal power on a to-be-measured node to obtain a power array $Q=[Q_1, \ldots, Q_N]$. In some embodiments, the power reading module of FIG. 3 to FIG. 7 may perform measurement multiple times to measure a second optical signal (an optical signal that is on the to-be-measured node and is polluted by noise).

704. Calculate a CCA parameter. In some embodiments, it is assumed that the transmission source power array $P=[1, 1.1, 1.2, 0.99, 0.95]$, that is, a power array with a length of 5 is obtained after power measurement is performed five times. Because of a measurement error, values of the five measurements may fluctuate. It is assumed that a correction value of a channel response is 0.9, a corrected array should be $Ph=P \times 0.9=[0.9, 0.99, 1.08, 0.891, 0.855]$. It is assumed that similarly, power of a to-be-measured signal is read five times to obtain an array $Q=[6.1, 6.2, 6.4, 5.8, 5.4]$. Similarly, because of a measurement error, measured values may fluctuate. In the process of calculating the CCA parameter, a mutual correlation between P and Q is calculated first, where $E[(Ph)Q]=0.9\times6.1+0.99\times6.2+1.08\times6.4+0.891\times5.8+0.855\times5.4=28.32$.

Then, an autocorrelation of Ph is calculated, where $E[(Ph)^2]=0.9\times0.9+0.99\times0.99+1.08\times1.08+0.891\times0.891+0.855\times0.855=5.46$.

An autocorrelation of Q is calculated, where $E[Q^2]=6.1\times6.1+6.2\times6.2+6.4\times6.4+5.8\times5.8+5.4\times5.4=179.4$.

The CCA parameter is calculated by using the following formula:

$$\rho = \frac{E(PQ)}{\sqrt{E(P^2)E(Q^2)}},$$

where the calculation of the CCA parameter is: $\rho=E[(Ph)Q]/\text{sqrt}(E[(Ph)^2]\times E[Q^2])=0.9$.

705. Calculate an OSNR. In some embodiments, after the CCA parameter is obtained, the OSNR may be calculated by using the following formula:

$$OSNR = \frac{\rho^2}{1-\rho^2}.$$

It can be demonstrated by means of analysis and calculation that the OSNR parameter and a real OSNR have a linear relationship. The linear relationship may be obtained in advance by means of calibration and stored on an OPM node. Once the OSNR parameter is obtained, an OSNR of a to-be-measured signal may be directly read from the linear relationship. The foregoing process may be repeated multiple times to obtain an average of OSNRs, so as to improve OSNR calculation precision.

Therefore, an optical power of the optical signal that is in the transmission source and is not polluted by noise and an optical power of the optical signal that is on the to-be-measured node and is polluted by noise are obtained by means of time synchronization, and the optical signal-to-noise ratio on the to-be-measured node is determined according to signal correlation between the optical signal polluted by noise and the optical signal not polluted by noise. The OSNR can be precisely measured by using this method without being limited by a feature of an optical signal.

Figure 8:
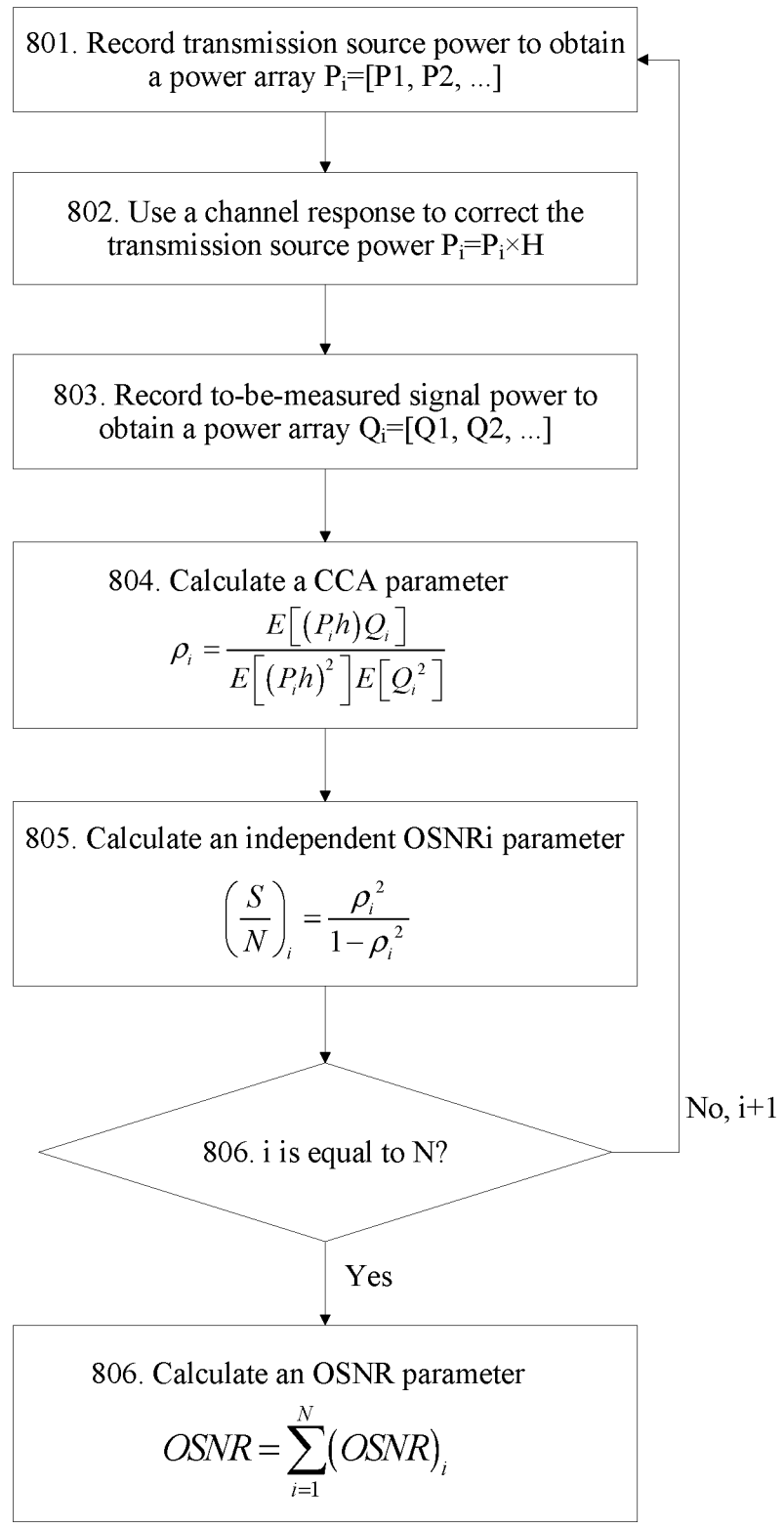
FIG. 8 is a schematic flowchart of calculating an OSNR according to another embodiment of the present invention.

FIG. 8 is a schematic flowchart of calculating an OSNR according to another embodiment of the present invention. A process of measuring, on N frequency bands, power on the frequency bands includes:

801. Record transmission source power on the $i^{th}$ frequency band to obtain a power array $P_i=[P_1, \ldots, P_N]$. In some embodiments, the power reading module in FIG. 3 to FIG. 7 may perform measurement multiple times to obtain a first optical signal (an optical signal that is in a signal source and is not polluted by noise).

802. Use a channel response H to correct the transmission source power $P_i=P_i \times H$.

803. Record power of a signal on a to-be-measured node on the $i^{th}$ frequency band to obtain a power array $Q_i=[Q_1, \ldots, Q_N]$. In some embodiments, the power reading module in FIG. 3 to FIG. 7 may perform measurement multiple times to obtain a second optical signal (an optical signal that is on the to-be-measured node and is polluted by noise).

804. Calculate a CCA parameter. In some embodiments, the CCA parameter is calculated by using the following formula:

$$\rho_i = \frac{E(PQ)}{\sqrt{E(P^2)E(Q^2)}}.$$

805. Calculate an OSNR$_i$ parameter. In some embodiments, after the CCA parameter is obtained, the OSNR$_i$ parameter may be calculated by using the following formula:

$$OSNR_i = \frac{\rho_i^2}{1-\rho_i^2}.$$

806. Determine whether the $i^{th}$ frequency band is N, and if the $i^{th}$ frequency band is not N, $i=i+1$, and steps 801 to 805 are repeated, and an optical signal-to-noise ratio on a new $i^{th}$ frequency band is calculated.

807. Average optical signal-to-noise ratios on the N frequency bands to obtain a final optical signal-to-noise ratio.

$$OSNR = \sum_{i=1}^{N}(OSNR)_i$$

It can be demonstrated by means of analysis and calculation that the OSNR parameter and a real OSNR have a linear relationship. The linear relationship may be obtained in advance by means of calibration and stored on an OPM node. Once the OSNR parameter is obtained, an OSNR of a to-be-measured signal may be directly read from the linear relationship. The foregoing process may be repeated multiple times to obtain an average of OSNRs, so as to improve OSNR calculation precision.

Therefore, an optical power of the optical signal that is in the transmission source and is not polluted by noise and an optical power of the optical signal that is on the to-be-measured node and is polluted by noise are obtained by means of time synchronization, and the optical signal-to-noise ratio on the to-be-measured node is determined according to signal correlation between the optical signal polluted by noise and the optical signal not polluted by noise. The OSNR can be precisely measured by using this method without being limited by a feature of an optical signal.

Figure 9:
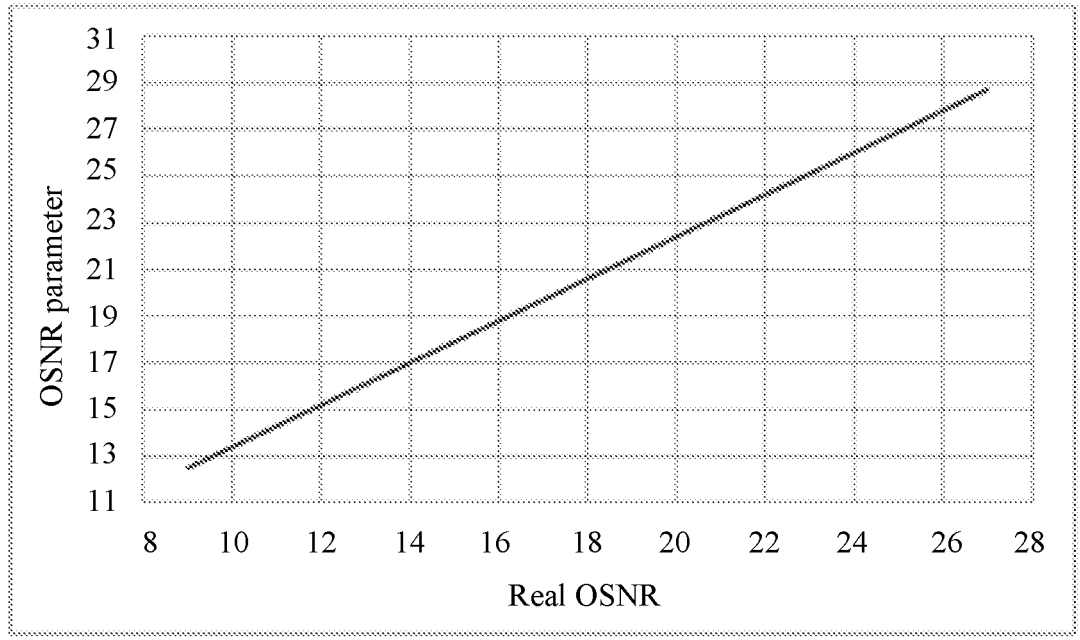
FIG. 9 is a schematic diagram of a relationship between an obtained OSNR parameter and a real OSNR according to an embodiment of the present invention.

FIG. 9 is a schematic diagram of a relationship between an obtained OSNR parameter and a real OSNR according to an embodiment of the present invention.

As shown in FIG. 9, an actually measured OSNR parameter and a real OSNR may have a linear relationship. The linear relationship may be obtained in advance by means of calibration and stored on an OPM node. Once the OSNR parameter is obtained, a real OSNR of a to-be-measured signal may be directly read from the linear relationship.

Figure 10:
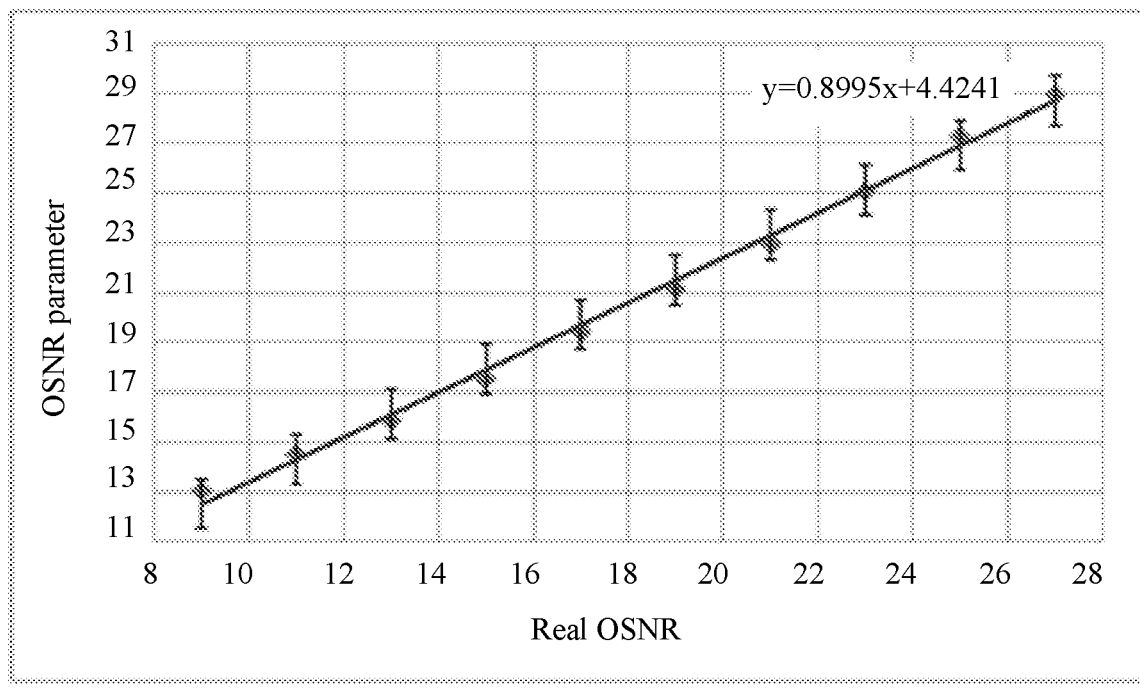
FIG. 10 is a schematic diagram of a relationship between an OSNR parameter according to an embodiment of the present invention and an OSNR parameter obtained in a polarization multiplexing QPSK system.

FIG. 10 is a schematic diagram of a relationship between an obtained OSNR parameter and an OSNR parameter obtained in a polarization multiplexing QPSK system according to an embodiment of the present invention.

In FIG. 10, it can be demonstrated from simulation of a polarization multiplexing QPSK system that an OSNR parameter and a real OSNR have a linear relationship within a range of 9 dB to 27 dB. When six power points are used and measurements are made ten times, and averaging are performed, an error of an estimated OSNR may be within +/−1 dB, and the OSNR parameter is more precise compared with that measured in the polarization multiplexing system.

In addition, signals are transmitted in two orthogonal polarization states in the polarization multiplexing QPSK system; therefore, a signal and noise composition may not be distinguished by using a polarization detection method. This method also suffers from impact of a polarization-dependent loss (PDL). A PDL effect makes power of noise in the two polarization states inequivalent; and therefore, noise power in one polarization state cannot be simply multiplied by two to obtain real noise power.

Therefore, according some embodiments, an optical power of the optical signal that is in the transmission source and is not polluted by noise and an optical power of the optical signal that is on the to-be-measured node and is polluted by noise are obtained by means of time synchronization, and the optical signal-to-noise ratio on the to-be-measured node is determined according to signal correlation between the optical signal polluted by noise and the optical signal not polluted by noise. The OSNR can be precisely measured by using this method without being limited by a feature of an optical signal.

Figure 11:
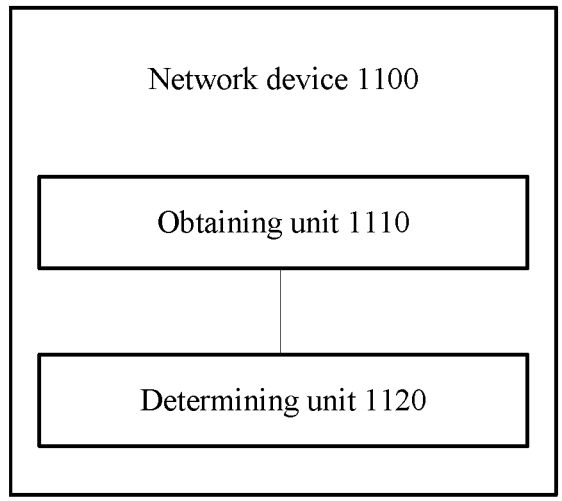
FIG. 11 is a schematic block diagram of a network device according to the present invention.

FIG. 11 is a schematic block diagram of a network device according to the present invention. As shown in FIG. 11, the network device 11 includes:

an measurement unit 1110 configured to measure a power $p_i$ of a first optical signal on a target frequency band at a moment Ti, and measure a power $q_i$ of a second optical signal on the target frequency band at a moment Ti+Δt. The first optical signal is a signal detected in an optical signal transmission source, the second optical signal is a signal detected on a to-be-measured node, Δt is a transmission duration of transmitting an optical signal from the optical signal transmission source to the to-be-measured node, $1 \le i \le N$, and N is a positive integer greater than 1; and a determining unit 1120 configured to determine an optical signal-to-noise ratio on the to-be-measured node based on a power array $P=[p_1, p_N]$ of the first optical signal on the target frequency band and a power array $Q=[q_1, q_N]$ of the second optical signal on the target frequency band.

Therefore, an optical power of the optical signal that is in the transmission source and is not polluted by noise and an optical power of the optical signal that is on the to-be-measured node and is polluted by noise are obtained by means of time synchronization, and the optical signal-to-noise ratio on the to-be-measured node is determined according to signal correlation between the optical signal polluted by noise and the optical signal not polluted by noise. The OSNR can be precisely measured by using this method without being limited by a feature of an optical signal.

In some embodiments, the determining unit 1120 is configured to obtain a canonical correlation analysis CCA parameter for the first optical signal and the second optical signal on the target frequency band based on the power array $P=[p_1, p_N]$ of the first optical signal on the target frequency band and the power array $Q=[q_1, q_N]$ of the second optical signal on the target frequency band, and determine an optical signal-to-noise ratio parameter on the to-be-measured node using the CCA parameter.

In some embodiments, the determining unit 1120 is configured to perform a correlation operation on the power array $P=[p_1, p_N]$ and the power array $Q=[q_1, q_N]$, which may include calculating the canonical correlation analysis CCA parameter for the first optical signal and the second optical signal on the target frequency band by using the following formula:

$$\rho = \frac{E(PQ)}{\sqrt{E(P^2)E(Q^2)}},$$

where $E(PQ)=\sum_{i=1}^{i=N}(p_i \times q_i)$, $E(P^2)=\sum_{i=1}^{i=N}(p_i \times p_i)$, and $E(Q^2)=\sum_{i=1}^{i=N}(q_i \times q_i)$; and calculating the optical signal-to-noise ratio parameter on the to-be-measured node using the CCA parameter by using the following formula:

$$O = \frac{\rho^2}{1-\rho^2}.$$

In some embodiments, the determining unit 1120 is configured to correct the power array $P=[p_1, p_N]$ of the first optical signal on the target frequency band using a channel response parameter H to obtain a corrected power array $P'=P \times H$ of the first optical signal, correct the power array $Q=[q_1, q_N]$ of the second optical signal on the target frequency band using the channel response parameter H to obtain a corrected power array $Q'=Q \times H$ of the second optical signal, and calculate the CCA parameter for the first optical signal and the second optical signal on the target frequency band based on the corrected power array P' of the first optical signal and the corrected power array Q' of the second optical signal.

In some embodiments, the target frequency band includes N frequency bands with an interval between adjacent frequency bands. The obtaining unit 1110 is configured to obtain a power $p_{ij}$ of the first optical signal on the $j^{th}$ frequency band, and obtain a power $q_{ij}$ of the second optical signal on the $j^{th}$ frequency band, where $1 \le j \le M$, and M is a positive integer greater than 1. The determining unit 1120 is configured to: determine an optical signal-to-noise ratio parameter $O_j$ on the $j^{th}$ frequency band based on a power array $p_j=[p_{j1}, p_{jM}]$ of the first optical signal on the $j^{th}$ frequency band and a power array $q_j=[q_{j1}, q_{jM}]$ of the second optical signal on the $j^{th}$ frequency band, and determine an average of M optical signal-to-noise ratios $O_j$ as the optical signal-to-noise ratio parameter on the to-be-measured node.

In some embodiments, a center frequency of the target frequency band is substantially equal to a center frequency of the first optical signal, and a bandwidth of the target frequency band is less than a total frequency bandwidth of the first optical signal. The center frequency of the target frequency band is substantially equal to a center frequency of the second optical signal, and the bandwidth of the target frequency band is less than a total frequency bandwidth of the second optical signal.

In some embodiments, the obtaining unit includes at least one of a filter or a spectrograph.

Therefore, an optical power of the optical signal that is in the transmission source and is not polluted by noise and an optical power of the optical signal that is on the to-be-measured node and is polluted by noise are measured by means of time synchronization, and the optical signal-to-noise ratio on the to-be-measured node is determined according to signal correlation between the optical signal polluted by noise and the optical signal not polluted by noise. The OSNR can be precisely measured by using this method without being limited by a feature of an optical signal.

Figure 12:
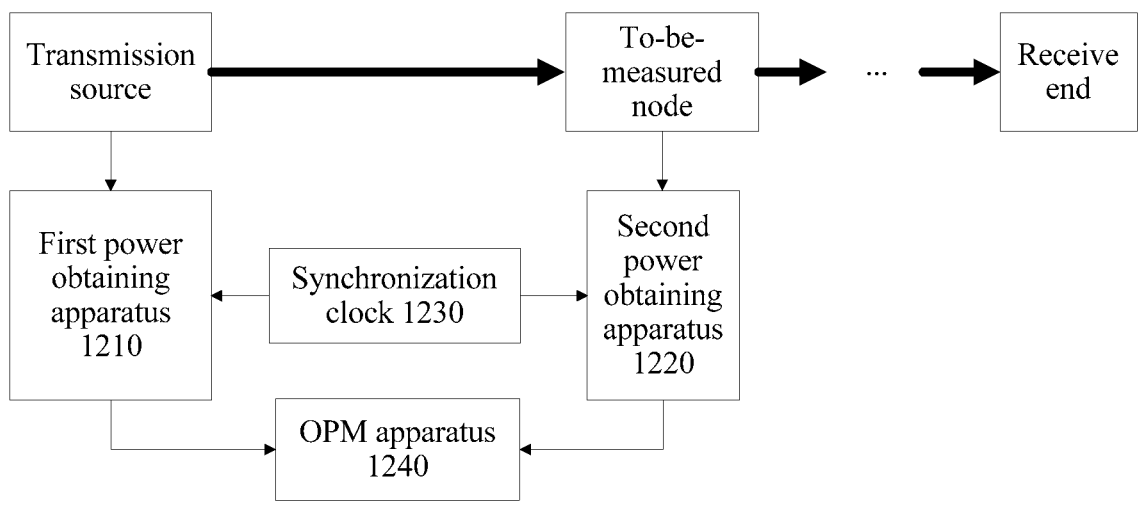
FIG. 12 shows an optical noise measurement system according to an embodiment of the present invention.

FIG. 12 shows an optical noise measurement system according to an embodiment of the present invention.

As shown in FIG. 12, the system 1200 includes a first power measurement apparatus 1210, a second power measurement apparatus 1220, a synchronization clock 1230, and an optical performance monitoring OPM apparatus 1240.

The first power measurement apparatus 1210 is configured to obtain a power of a first optical signal on a target frequency band, where the first optical signal is a signal detected in an optical signal transmission source.

The second power measurement apparatus 1220 is configured to measure a power of a second optical signal on the target frequency band, where the second optical signal is a signal detected on a to-be-measured node.

The synchronization clock 1230 is configured to synchronously control the first power measurement apparatus to measure a power $p_i$ of the first optical signal on the target frequency band at a moment Ti and control the second power measurement apparatus to measure a power $q_i$ of the second optical signal on the target frequency band at a moment $Ti+\Delta t$, where $1 \le i \le N$, and N is a positive integer greater than 1.

The OPM apparatus 1240 is configured to determine an optical signal-to-noise ratio on the to-be-measured node based on a power array $P=[p_1, p_N]$ of the first optical signal on the target frequency band and a power array $Q=[q_1, q_N]$ of the second optical signal on the target frequency band.

It should be further understood that the first power measurement apparatus 1210, the second power measurement apparatus 1220, the synchronization clock 1230, and the optical performance monitoring OPM apparatus 1240 may be integrated in any combination. For example, the synchronization clock 1230 and the optical performance monitoring OPM apparatus 1240 may be integrated on one device, and the foregoing apparatuses may also be integrated on an existing device on an optical communication link.

Therefore, an optical power of the optical signal that is in the transmission source and is not polluted by noise and optical power of the optical signal that is on the to-be-measured node and is polluted by noise are measured by means of time synchronization, and the optical signal-to-noise ratio on the to-be-measured node is determined according to signal correlation between the optical signal polluted by noise and the optical signal not polluted by noise. The OSNR can be precisely measured by using this method without being limited by a feature of an optical signal.

In some embodiments, the OPM apparatus 1240 is configured to obtain a canonical correlation analysis CCA parameter for the first optical signal and the second optical signal on the target frequency band based on the power array $P=[p_1, p_N]$ of the first optical signal on the target frequency band and the power array $Q=[q_1, q_N]$ of the second optical signal on the target frequency band, and determine an optical signal-to-noise ratio parameter on the to-be-measured node using the CCA parameter.

In some embodiments, the OPM apparatus 1240 is configured to perform a correlation operation on the power array $P=[p_1, p_N]$ and the power array $Q=[q_1, q_N]$, which may include calculating the canonical correlation analysis CCA parameter for the first optical signal and the second optical signal on the target frequency band by using the following formula:

$$\rho = \frac{E(PQ)}{\sqrt{E(P^2)E(Q^2)}},$$

where $E(PQ)=\Sigma_{i=1}^{i=N}(p_i \times q_i)$, $E(P^2)=\Sigma_{i=1}^{i=N}(p_i \times p_i)$, and $E(Q^2)=\Sigma_{i=1}^{i=N}(q_i \times q_i)$; and calculating the optical signal-to-noise ratio parameter on the to-be-measured node using the CCA parameter by using the following formula:

$$O = \frac{\rho^2}{1-\rho^2}.$$

In some embodiments, the OPM apparatus 1240 is configured to correct the power array $P=[p_1, p_N]$ of the first optical signal on the target frequency band using a channel response parameter H to obtain a corrected power array $P'=P \times H$ of the first optical signal, correct the power array $Q=[q_1, q_N]$ of the second optical signal on the target frequency band using the channel response parameter H to obtain a corrected power array $Q'=Q \times H$ of the second optical signal, and calculate the CCA parameter for the first optical signal and the second optical signal on the target frequency band based on the corrected power array P' of the first optical signal and the corrected power array Q' of the second optical signal.

In some embodiments, the target frequency band includes N frequency bands with an interval between adjacent frequency bands. The first power measurement apparatus 1210 is configured to obtain a power $p_{ij}$ of the first optical signal on the $j^{th}$ frequency band. The second power measurement apparatus 1220 is configured to obtain a power $q_{ij}$ of the second optical signal on the $j^{th}$ frequency band, where $1 \le j \le M$, and M is a positive integer greater than 1. The OPM apparatus 1240 is configured to: determine an optical signal-to-noise ratio parameter $O_j$ on the $j^{th}$ frequency band based on a power array $p_i=[p_{i1}, p_{iM}]$ of the first optical signal on the $j^{th}$ frequency band and a power array $q_i=[q_{i1}, q_{iM}]$ of the second optical signal on the $j^{th}$ frequency band, and determine an average of M optical signal-to-noise ratios $O_j$ as the optical signal-to-noise ratio parameter on the to-be-measured node.

In some embodiments, a center frequency of the target frequency band is substantially equal to a center frequency of the first optical signal, and a bandwidth of the target frequency band is less than a total frequency bandwidth of the first optical signal. The center frequency of the target frequency band is substantially equal to a center frequency of the second optical signal, and the bandwidth of the target frequency band is less than a total frequency bandwidth of the second optical signal.

In some embodiments, the first power measurement apparatus 1210 includes at least one of a filter or a spectrograph; and the second power measurement apparatus 1220 includes at least one of a filter or a spectrograph.

Therefore, an optical power of the optical signal that is in the transmission source and is not polluted by noise and an optical power of the optical signal that is on the to-be-measured node and is polluted by noise are measured by means of time synchronization, and the optical signal-to-noise ratio on the to-be-measured node is determined according to signal correlation between the optical signal polluted by noise and the optical signal not polluted by noise. The OSNR can be precisely measured by using this method without being limited by a feature of an optical signal.

A person of ordinary skill in the art may be aware that, in combination with the examples described in the embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The invention claimed is:

1. An optical signal measurement method comprising:
    measuring a power pi of a first optical signal on a target frequency band at a moment Ti, and measuring a power qi of a second optical signal on the target frequency band at a moment Ti+Δt, wherein the first optical signal is a signal detected in an optical signal transmission source, the second optical signal is a signal detected on a to-be-measured node, Δt is a transmission duration of transmitting an optical signal from the optical signal transmission source to the to-be-measured node, 1<i<N, and N is a positive integer greater than 1; and
    determining a canonical correlation analysis (CCA) parameter for the first optical signal and the second optical signal on the target frequency band based on the power array P=[pi, pN] of the first optical signal on the target frequency band and the power array Q=[qi, qN] of the second optical signal on the target frequency band; and
    determining an optical signal-to-noise ratio on the to-be-measured node using the CCA parameter.

2. The method according to claim 1, wherein the determining the canonical correlation analysis (CCA) parameter for the first optical signal and the second optical signal on the target frequency band based on the power array P=[$p_1$, $p_N$] of the first optical signal on the target frequency band and the power array Q=[$q_1$, $q_N$] of the second optical signal on the target frequency band comprises:
  performing a correlation operation on the power array P=[$p_1$, $p_N$] and the power array Q=[$q_1$, $q_N$] by:
  calculating the CCA parameter for the first optical signal and the second optical signal on the target frequency band as:

$$\rho = \frac{E(PQ)}{\sqrt{E(P^2)E(Q^2)}},$$

wherein E(PQ)=$\Sigma_{i=1}^{i=N}(p_i \times q_i)$, E($P^2$)=$\Sigma_{i=1}^{i=N}(p_i \times p_i)$, and E($Q^2$)=$\Sigma_{i=1}^{i=N}(q_i \times q_i)$; and
calculating the optical signal-to-noise ratio on the to-be-measured node using the CCA parameter as:

$$O = \frac{\rho^2}{1-\rho^2}.$$

3. The method according to claim 1, wherein the determining the canonical correlation analysis (CCA) parameter for the first optical signal and the second optical signal on the target frequency band on the power array P=[$p_1$, $p_N$] of the first optical signal on the target frequency band and the power array Q=[$q_1$, $q_N$] of the second optical signal on the target frequency band comprises:
  correcting the power array P=[$p_1$, $p_N$] of the first optical signal on the target frequency band using a channel response parameter H to obtain a corrected power array P'=P×H of the first optical signal;
  calculating the CCA parameter for the first optical signal and the second optical signal on the target frequency band based on the corrected power array P' of the first optical signal and the power array Q of the second optical signal.

4. The method according to claim 1, wherein:
the target frequency band comprises M frequency bands with an interval, and the measuring the power $p_i$ of the first optical signal on the target frequency band at the moment Ti, and measuring the power $q_i$ of the second optical signal on the target frequency band at the moment Ti+Δt comprises measuring power $p_{ij}$ of the first optical signal on a $j^{th}$ frequency band, and measuring power $q_{ij}$ of the second optical signal on the $j^{th}$ frequency band, wherein 1≤j≤M, and M is a positive integer greater than 1; and
the determining the optical signal-to-noise ratio on the to-be-measured node based on the correlation between the power array P=[$p_1$, $p_N$] of the first optical signal on the target frequency band and the power array Q=[$q_1$, $q_N$] of the second optical signal on the target frequency band comprises obtaining an optical signal-to-noise ratio $O_j$ on the $j^{th}$ frequency band based on the correlation between a power array $p_i$=[$p_{i1}$, $p_{iM}$] of the first optical signal on the $j^{th}$ frequency band and a power array $q_i$=[$q_{i1}$, $q_{iM}$] of the second optical signal on the $j^{th}$ frequency band, and determining an average of M optical signal-to-noise ratios $O_j$ as the optical signal-to-noise ratio on the to-be-measured node.

5. The method according to claim 1, wherein:
a center frequency of the target frequency band is substantially equal to a center frequency of the first optical signal, and a bandwidth of the target frequency band is less than a total frequency bandwidth of the first optical signal; and
the center frequency of the target frequency band is substantially equal to a center frequency of the second optical signal, and the bandwidth of the target frequency band is less than a total frequency bandwidth of the second optical signal.

6. A network device comprising:
a receiver configured to measure a power pi of a first optical signal on a target frequency band at a moment Ti, and measure power qi of a second optical signal on the target frequency band at a moment Ti+Δt, wherein the first optical signal is a signal detected in an optical signal transmission source, the second optical signal is a signal detected on a to-be-measured node, Δt is a transmission duration of transmitting an optical signal from the optical signal transmission source to the to-be-measured node, 1<i<N, and N is a positive integer greater than 1; and
a processor configured to determine a canonical correlation analysis (CCA) parameter for the first optical signal and the second optical signal on the target frequency band based on the power array P=[pi, pN] of the first optical signal on the target frequency band and the power array Q=[qi, qN] of the second optical signal on the target frequency band; and
determine an optical signal-to-noise ratio on the to-be-measured node using the CCA parameter.

7. The device according to claim 6, wherein the processor is further configured to perform a correlation operation on the power array P=[$p_1$, $p_N$] and the power array Q=[$q_1$, $q_N$] by:
  calculating the CCA parameter for the first optical signal and the second optical signal on the target frequency band as:

$$\rho = \frac{E(PQ)}{\sqrt{E(P^2)E(Q^2)}},$$

wherein E(PQ)=$\Sigma_{i=1}^{i=N}(p_i \times q_i)$, E($P^2$)=$\Sigma_{i=1}^{i=N}(p_i \times p_i)$, and E($Q^2$)=$\Sigma_{i=1}^{i=N}(q_i \times q_i)$; and
calculating the optical signal-to-noise ratio on the to-be-measured node using the CCA parameter as:

$$O = \frac{\rho^2}{1-\rho^2}.$$

8. The device according to claim 6, wherein the processor is further configured to:
  correct the power array P=[$p_1$, $p_N$] of the first optical signal on the target frequency band using a channel response parameter H to obtain a corrected power array P'=P×H of the first optical signal;
  calculate the CCA parameter for the first optical signal and the second optical signal on the target frequency band based on the corrected power array P' of the first optical signal and the power array Q of the second optical signal.

9. The device according to claim 6, wherein:
the target frequency band comprises M frequency bands with an interval;
the receiver is configured to obtain a power $p_{ij}$ of the first optical signal on a $j^{th}$ frequency band, and obtain a power $q_{ij}$ of the second optical signal on the $j^{th}$ frequency band, wherein $1 \leq j \leq M$, and M is a positive integer greater than 1; and
the processor is configured to obtain an optical signal-to-noise ratio $O_j$ on the $j^{th}$ frequency band based on a correlation between a power array $p_i=[p_{i1}, p_{iM}]$ of the first optical signal on the $j^{th}$ frequency band and a power array $q_i=[q_{i1}, q_{iM}]$ of the second optical signal on the $j^{th}$ frequency band, and determine an average of M optical signal-to-noise ratios $O_j$ as the optical signal-to-noise ratio on the to-be-measured node.

10. The device according to claim 6, wherein:
a center frequency of the target frequency band is substantially equal to a center frequency of the first optical signal, and a bandwidth of the target frequency band is less than a total frequency bandwidth of the first optical signal; and
the center frequency of the target frequency band is substantially equal to a center frequency of the second optical signal, and the bandwidth of the target frequency band is less than a total frequency bandwidth of the second optical signal.

11. An optical signal measurement system comprising:
a first power measurement apparatus;
a second power measurement apparatus;
a synchronization clock; and
an optical performance monitoring (OPM) apparatus; wherein:
the first power measurement apparatus is configured to measure a power of a first optical signal on a target frequency band, wherein the first optical signal is a signal detected in an optical signal transmission source;
the second power measurement apparatus is configured to measure a power of a second optical signal on the target frequency band, wherein the second optical signal is a signal detected on a to-be-measured node;
the synchronization clock is configured to: control the first power measurement apparatus to measure a power pi of the first optical signal on the target frequency band at a moment Ti, and control the second power measurement apparatus to measure a power qi of the second optical signal on the target frequency band at a moment Ti+Δt, wherein Δt is a transmission duration of transmitting an optical signal from the optical signal transmission source to the to-be-measured node, $1<i<N$, and N is a positive integer greater than 1; and
the OPM apparatus is configured to obtain a canonical correlation analysis (CCA) parameter for the first optical signal and the second optical signal on the target frequency band based on the power array P=[pi, pN] of the first optical signal on the target frequency band and the power array Q=[qi, qN] of the second optical signal on the target frequency band; and
determine an optical signal-to-noise ratio on the to-be-measured node using the CCA parameter.

12. The system according to claim 11, wherein the OPM apparatus is configured to perform a correlation operation on the power array $P=[p_1, p_N]$ and the power array $Q=[q_1, q_N]$ by:
calculating the CCA parameter for the first optical signal and the second optical signal on the target frequency band as:

$$\rho = \frac{E(PQ)}{\sqrt{E(P^2)E(Q^2)}},$$

wherein $E(PQ)=\Sigma_{i=1}^{i=N}(p_i \times q_i)$, $E(P^2)=\Sigma_{i=1}^{i=N}(p_i \times p_i)$, and $E(Q^2)=\Sigma_{i=1}^{i=N}(q_i \times q_i)$; and
calculating the optical signal-to-noise ratio on the to-be-measured node using the CCA parameter as:

$$O = \frac{\rho^2}{1-\rho^2}.$$

13. The system according to claim 11, wherein the OPM apparatus is configured to:
correct the power array $P=[p_1, p_N]$ of the first optical signal on the target frequency band using a channel response parameter H to obtain a corrected power array $P'=P \times H$ of the first optical signal;
calculate the CCA parameter for the first optical signal and the second optical signal on the target frequency band based on the corrected power array P' of the first optical signal and the power array Q of the second optical signal.

14. The system according to claim 11, wherein:
the target frequency band comprises M frequency bands with an interval;
the first power measurement apparatus is configured to obtain a power $p_{ij}$ of the first optical signal on a $j^{th}$ frequency band;
the second power measurement apparatus is configured to obtain a power $q_{ij}$ of the second optical signal on the $j^{th}$ frequency band, wherein $1 \leq j \leq M$, and M is a positive integer greater than 1; and
the OPM apparatus is configured to obtain an optical signal-to-noise ratio $O_j$ on the $j^{th}$ frequency band based on a correlation between a power array $p_i=[p_{i1}, p_{iM}]$ of the first optical signal on the $j^{th}$ frequency band and a power array $q_i=[q_{i1}, q_{iM}]$ of the second optical signal on the $j^{th}$ frequency band, and determine an average of M optical signal-to-noise ratios $O_j$ as the optical signal-to-noise ratio on the to-be-measured node.

15. The system according to claim 11, wherein a center frequency of the target frequency band is substantially equal to a center frequency of the first optical signal, and a bandwidth of the target frequency band is less than a total frequency bandwidth of the first optical signal; and
the center frequency of the target frequency band is substantially equal to a center frequency of the second optical signal, and the bandwidth of the target frequency band is less than a total frequency bandwidth of the second optical signal.

16. The system according to claim 11, wherein:
the first power measurement apparatus comprises at least one of a filter or a spectrograph; and
the second power measurement apparatus comprises at least one of a filter or a spectrograph.

* * * * *